US006804247B1

(12) United States Patent
Sasyan et al.

(10) Patent No.: US 6,804,247 B1
(45) Date of Patent: Oct. 12, 2004

(54) SYSTEM PROVIDING FOR MULTIPLE VIRTUAL CIRCUITS BETWEEN TWO NETWORK ENTITIES

(75) Inventors: Serge Sasyan, Seyssinet (FR); Denis Roger, Varces (FR); Denis Terrasse, Eybens (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 851 days.

(21) Appl. No.: 09/580,603

(22) Filed: May 30, 2000

Related U.S. Application Data

(62) Division of application No. 08/940,260, filed on Sep. 30, 1997, now Pat. No. 6,222,842.

(30) Foreign Application Priority Data

Oct. 10, 1996 (EP) .............................................. 96410106

(51) Int. Cl.[7] .......................... H04L 12/56; H04L 12/28
(52) U.S. Cl. .................... 370/397; 370/395.6; 370/400; 370/463; 370/466; 709/238
(58) Field of Search ................................. 370/230, 236, 370/353, 355, 392, 397, 328, 395.1, 395.2, 395.3, 395.53, 395.6, 400–409, 419, 463, 465, 466; 709/218, 238

(56) References Cited

U.S. PATENT DOCUMENTS

| | | | | |
|---|---|---|---|---|
| 5,517,497 A | * | 5/1996 | Le Boudec et al. | 370/399 |
| 5,521,917 A | * | 5/1996 | Watanabe et al. | 370/399 |
| 5,793,763 A | * | 8/1998 | Mayes et al. | 370/389 |
| 6,016,319 A | * | 1/2000 | Kshirsagar et al. | 370/410 |

* cited by examiner

*Primary Examiner*—Afsar Qureshi

(57) ABSTRACT

Computers sending IP datagrams over an ATM network are generally capable of operating multiple simultaneous virtual circuits over the network. However, in doing so, they normally only set up one virtual circuit to each destination IP address so that in order to test the simultaneous operation of N virtual circuits by a computer under test, N target computers are needed. To enable a single computer (T) to provide the destination endpoints for multiple virtual circuits (SVC) from a computer (M) under test, both computers (M,T) are allocated a plurality of virtual IP addresses ($I_{M(i)}, I_{T(i)}$) and the target computer (T) is additionally provided with a module running address-changing processes (70,71) that avoids the IP layers (20) of both computers from rejecting IP datagrams (25A,25B) addressed with the virtual IP addresses. As a result, each computer (M,T) can be addressed with any of a plurality of IP addresses and each will result in the creation of a respective virtual circuit (SVC) between the computers (M,T).

8 Claims, 5 Drawing Sheets

SYSTEM PROVIDING FOR MULTIPLE VIRTUAL CIRCUITS BETWEEN TWO NETWORK ENTITIES

CROSS REFERENCE TO RELATED APPLICATION

This is a divisional of application Ser. No. 08/940,260, filed on Sep. 30, 1997, now U.S. Pat. No. 6,227,842.

FIELD OF THE INVENTION

The present invention relates to a system providing for multiple virtual circuits between two network entities for use in particular, but not exclusively, in the testing of network node apparatus providing IP messaging over an ATM network.

BACKGROUND OF THE INVENTION

As is well-known, the Internet Protocol (IP) uses a scheme of IP addresses by which every connection of a node to the Internet has a unique IP address. IP addresses are high-level addresses in the sense that they are independent of the technology used for the underlying network to which a node is connected. Each node will also have a low-level, network-dependent address (often callled the MAC address) that is actually used for addressing at the network level and the IP protocol suite includes an address reolution protocol (ARP), logically positioned below the IP layer itself, that is responsible for translating between IP addresses contained in a message and the local MAC addresses.

An increasingly important technology for local area networks is ATM. ATM (Asynchronous Transfer Mode) is a multiplexing and switching technique for transferring data across a network using fixed sized cells that are synchronous in the sense that they appear strictly periodically on the physical medium. Each cell comprises a payload portion and a header, the latter including a label that associates the cell with an instance of communication between sending and receiving network end systems; this instance of communication may involve the transfer of many cells from the sending end system, possibly to multiple receiving end systems. ATM is asynchronous in the sense that cells belonging to the same instance of communication will not necessarily appear at periodic intervals.

In ATM, the labels appended to the cells are fixed-size context dependent labels, that is, they are only understandable in the light of context information already established at the interpreting network node, the label generally being replaced at one node by the label required for the next node. In other words, ATM is a virtual circuit technology requiring a set up phase for each instance of communication to establish the appropriate label knowledge at each node. Of course, to set up a desired communication, it is still necessary to identify uniquely the nodes forming the communication end points and this is achieved by using ATM addresses, generally of a significance limited to the particular ATM network concerned.

The process of sending IP messages (datagrams) over an ATM network, including the operation of the required ATM ARP system, is set out in RFC 1577 of the IETF Internet Engineering Task Force) dated January 1993. This RFC assumes an arrangement in which a sending node will only establish a single vircuit circuit to a given destination IP address (of course, this one vircuit circuit may carry multiple connections between respective pairings of high-level end points in the nodes).

FIG. 1 of the accompanying drawings is a diagram illustrating the basic mechanism by which two machines M and T exchange IP datagrams over a switched virtual circuit (SVC) established across an ATM network. The machines M and T have respective IP addresses $I_M$ and $I_T$ and respective ATM addresses $A_M$ and $A_T$; each machine knows its own addresses. An ATMARP server S knows the IP and ATM addresses of all active nodes on the network, including machines M and T; more particularly, server S maintains an ARP table 15 associating the IP address of each node with its ATM address. The server S maintains open a respective SVC (switched virtual circuit) to each active node and the identity of this SVC is held in the ARP table 15; thus, in the FIG. 1 example, the server S is in communication with machine M over an SVC identified as SVC "1" at the server, and the server S is in communication with machine T over an SVC identified as SVC "2" at the server S. At machines M and T these virtual circuits are independently identified—thus at machine M its SVC to the server S is identified as SVC "3" whilst at machine T its SVC to the server S is identified as SVC "5".

The communications interface 18 in each of the machines M and T comprises three main layers, namely: an IP layer 20 responsible for forming IP datagrams (including source and destination IP addresses) for transmission and for filtering incoming datagrams; an intermediate IP/ATM layer 21 for determining the SVC corresponding to the destination IP address of an outgoing datagram; and an ATM layer 22, including the low-level network interface hardware, for sending and receiving datagrams packaged in ATM cells over SVCs.

The IP/ATM layer 21 maintains an ARP cache table 27 which like the table 15 of the server S contains associations between IP address, ATM address and SVC. Thus, table 27 of machine M contains an entry of the IP address $I_S$, ATM address $A_S$, and SVC identity "3" for the server S, and similarly, table 27 of machine T contains an entry of the IP address $I_S$, ATM address $A_S$, and SVC identity "5" for the server S. The cache table 27 only holds information relevant to current SVCs of the machine concerned so that during the initial establishment of an SVC to a new destination, the cache table must be updated with relevant information from the ATMARP server S; this general process will be described in more detail hereinafter with reference to FIG. 2. For the present, it will be assumed that an SVC has already been established between machines M and T and that the cache tables contain the relevant information (in particular, cache table 27 of machine M contains an entry with the IP address $I_T$, ATM address $A_T$, and SVC identity "4" for machine T, and cache table 27 of machine T contains an entry with the IP address $I_M$, ATM address $A_M$, and SVC identity "9" for machine M).

Considering now the case of a high-level application in machine M wanting to send a message to machine T, this application passes the message to the IP layer 20 together with the destination IP address IT IP layer 20 packages the message in one (or more) datagrams 25A with a destination IP address of $I_T$ and source IP address of $I_M$. Datagram 25A is then passed to the IP/ATM layer 21 which executes an IP-to-SVC lookup task 30 to determine from table 27 the SVC to be used for sending the datagram to its destination address $I_T$; in the present case, table 27 returns the SVC identity "4" and the layer 21 passes this identity together with the datagram 25A to the ATM layer 22 which then sends the datagram in ATM cells on SVC "4". The datagram is in due course received by machine T and passed up by layers 22 and 21 to the IP layer 20 where a filtering task 29 determines from the datagram destination address that the datagram is indeed intended for machine T; the contents of the datagram are then passed to the relevant high-level application. In the present example, this high-level application produces a reply message which it passes to the IP layer 20 together with the required return address, namely the source IP address in the received datagram 25A. IP layer 20 generates datagram 25B with the received return address as the destination address, the IP address IT of machine T being included as the source address. The datagram 25B is passed to IP/ATM layer 21 where IP-to-SVC lookup task 30 determines from cache table 27 that the required destination can be reached over SVC "9". This information together with datagram 25B is then passed to ATM layer 22 which transmits the datagram in ATM cells over SVC "9" to machine M. When the datagram is received at machine M it is passed up to the IP layer 20 where it is filtered by task 29 and its contents then passed on to the relevant high-level application.

FIG. 2 of the accompanying drawings illustrates in more detail the functioning of the IP/ATM layers 21 of machines M and T in respect of datagram transmission from machine M to machine T, it being appreciated that the roles of the two layers 21 are reversed for transmission in the opposite direction. More particularly, upon the IP-to-SVC lookup task 30 being requested to send a datagram to IP address $I_T$, it first carries out a check of the cache table 27 (step 31) to determine if there is an existing entry for $I_T$ (and thus an SVC, assuming that entries are only maintained whilst an SVC exists). Step 32 checks the result of this lookup—if an SVC already exists (in this case, SVC "4"), then step 39 is executed in which the datagram is passed together with the identity of the relevant SVC to the ATM layer 22; however, if the lookup was unsuccessful, task 30 executes steps 33 to 38 to set up an SVC to destination $I_T$ before executing step 39.

The first step 33 of the setup process involves the sending of an ARP request to the ATMARP server S over the relevant SVC requesting the ATM address corresponding to $I_T$. Server responds with ATM address $A_T$ which is received by task 30 at step 34.

Task 30 now updates the cache table 27 with the IP address IT and ATM address AT (step 35). Next, task 30 requests (step 36) the ATM layer 22 to establish a new SVC to ATM address $A_T$ and this initiates an SVC setup process 28 which may be executed in any appropriate manner and will not be described in detail herein. In due course, process 28 returns the identity of the SVC that has been set up to $A_T$ (in this case, SVC "4"), this identity being received at step 37 of task 30. Finally, cache table 30 is updated at step 38 by adding the SVC identity ("4") to the entry already containing $I_T$ and $A_T$.

In machine T, the setup of the new SVC to the machine from machine M is handled by the setup process 28 of machine T. The process 28 informs the IP/ATM layer that a new SVC has been setup and this triggers execution of an update task 40 to update the cache table 27 of machine T. More particularly, on the new SVC indication being received (step 41), a first update step 42 is carried out to add an entry to the table containing the identity of the new SVC (in the present example "9"), and the ATM address $A_M$ of the node at the other end of the SVC; at this stage, the corresponding IP address is not known to machine T. In order to obtain this IP address, an inverse ARP request is now made to machine M (step 43). In due course a response is received (step 44) containing the IP address of machine M. The cache table 27 is then updated at step 45 with the IP address $I_M$ of machine M and the IP/ATM layer is now ready to effect IP-to-SVC translations for datagrams intended for machine M.

The inverse ARP request sent by machine T to machine M is handled by an inverse ARP task 50 that examines the request (step 51) and on finding that it contains the ATM address $A_M$, responds with the IP address $I_M$ of machine M (step 52).

To facilitate explanation of the preferred embodiment of the invention hereinafter, the messages across the boundary between the IP/ATM layer 21 and the ATM layer 22 have been labelled in FIG. 2 as follows where superscript "T" indicates an outgoing message (that is, from the IP/ATM layer to the ATM layer) and the superscript "R" indicates incoming messages (that is, from the ATM layer to the IP/ATM layer):

$X1^T$—outgoing ARP request;
$X2^R$—incoming ARP response;
$X3^T$—outgoing SVC setup request;
$X4^R$—incoming SVC setup done indication;
$X5^R$—incoming new SVC indication;
$X6^T$—outgoing INARP request;
$X6^R$—incoming INARP request;
$X7^T$—outgoing INARP response;
$X8^T$—outgoing datagram;
$X8^R$—incoming datagram.

It will be appreciated that machines connecting to an ATM network, such as machines M and T as well as the server S, are designed to handle a large number of virtual circuits simultanteously. If in testing such a machine (machine M in the following discussion) it is desired to fully stress the machine under test, then the design limit of concurrently operating virtual circuits must be simultaneously used. However, as already indicated, current practice is that only one virtual circuit is established to each distinct IP address. As a result, since generally each machine that might be used to test machine M has only one network connection and therefore only one IP address, if machine M is designed to operate up to N virtual circuits simultaneously, then it requires N machines to test machine M. Such an arrangement is illustrated in FIG. 3 where the N machines are constituted by the server S and (N−1) other machines here represented as machines T1 to T(N−1). Such an arrangement is generally impractical as N may be as high as 1024 or more.

It is an object of the present invention to provide a mechanism that enables, inter alia, the foregoing test problem to be overcome.

SUMMARY OF THE INVENTION

According to the present invention, there is provided a system in which a plurality of entities are connected to a network and can exchange messages across virtual circuits set up over the network between said entities, each entity having an operative high-level address on the network, and each entity comprising:

high-level messaging means for handling message transmission and receipt on the basis of the aforesaid high-level addresses, the high-level messaging means comprising means for including in outgoing messages the operative high-level address of the entity as a source identifier and the operative high level address of the intended recipient entity as a destination identifier, and means for filtering incoming messages according to the destination identifier contained in the message;

virtual-circuit means for providing virtual circuits between the entity and other entities, there being a respective virtual circuit for each different destination identifier in use, and intermediate means for passing an outgoing message from the high-level messaging means to that one of the virtual circuits provided by the virtual-circuit means which corresponds to the destination identifier of the message;

characterised in that each of a first and a second one of the entities has a plurality of virtual high-level addresses associated with it that are different from the operative high-level address of the entity, the virtual high-level addresses being usable by the messaging means of the first and second entities as destination identifiers in outgoing messages; and in that between the intermediate means of the first and second entities, there are provided address-changing means responsive to each of at least some of the messages sent between these entities with a said virtual high-level address as its destination identifier, to change that address to the operative high-level address of the corresponding entity and to change the operative high-level address provided as the source identifier of the message into one of the said virtual high-level addresses associated with the sending entity in dependence on the virtual high-level address initially provided as the destination identifier of the same message.

By virtue of this arrangement, it is possible to establish a plurality of virtual circuits between the first and second entities by using the different virtual high-level addresses of the entities as the destination identifiers in messages exchanged between the entities, the receiving high-level adressing means accepting such messages due to the address-changing means having changed the destination identifier to the operative high-level address of the receiving entity. By also changing the source identifier, it is possible to retain in the message information sufficient to associate any reply message with a particular one of the virtual circuits established with the sending entity (in particular, the reply message can be sent back over the same virtual circuit as the message to which it is a reply—however, if desired, it is also possible to use a separate virtual circuit for the reply messages).

Preferably, the address-changing means comprises first address-changing functionality for effecting the aforesaid changes for messages sent from the first entity to the second entity, and second address-changing functionality for effecting these changes for messages sent from the second entity to the first entity, both the first and second address-changing functionalities being provided in the second entity. This configuration is well suited for testing the ability of network node apparatus to concurrently operate a plurality of virtual circuits where the network node apparatus is operative to establish a virtual circuit for each different high-level destination address being handled; more particularly, the network node apparatus serves as the aforesaid first entity, and is caused to send messages to at least some of the virtual high-level addresses associated with the second entity. By placing the address-changing means in the second entity, no modifications are needed to the network node apparatus in order for it to be able to establish a plurality of virtual circuits with the second entity.

Advantageously, the address-changing means effects a predetermined transformation on the virtual high-level address forming the initial destination identifier of a said message in order to form the virtual high-level address to be used for the source identifier of that message. For example, this transformation may simply involved changing the address by one (where the address is numeric in form).

The present invention is particularly applicable to systems in which the high-level addresses are IP addresses and the network is an ATM network.

BRIEF DESCRIPTION OF THE DRAWINGS

A system embodying the invention will now be described, by way of non-limiting example, with reference to the accompanying diagrammatic drawings, in which.

BEST MODE OF CARRYING OUT THE INVENTION

Figure 4:
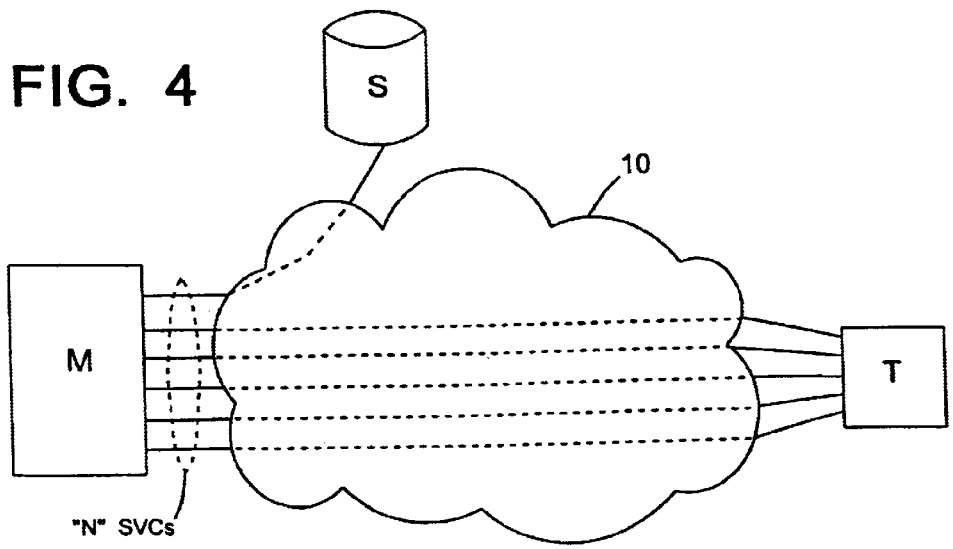
FIG. 4 is a diagram showing a test arrangement embodying the invention for testing the ability of a machine M to concurrently operate multiple virtual circuits.

The embodiment of the invention now to be described provides a system in which it is possible to establish a plurality of SVCs (switched virtual circuits) across an ATM network for the exchange of IP datagrams between two machines M and T whereby it is possible to test the ability of machine M to concurrently operate a plurality of virtual circuits without needing to provide a respective destination machine for each SVC operated by machine M. The overall test arrangement is illustrated in FIG. 4 where machine M operates N SVCs over ATM network 10, one SVC being with ATMARP server S and (N−1) SVCs being with machine T. According to the preferred embodiment, the establishment of multiple concurrent SVCs between machine M and T is effected without modification to machine M.

Figure 1:
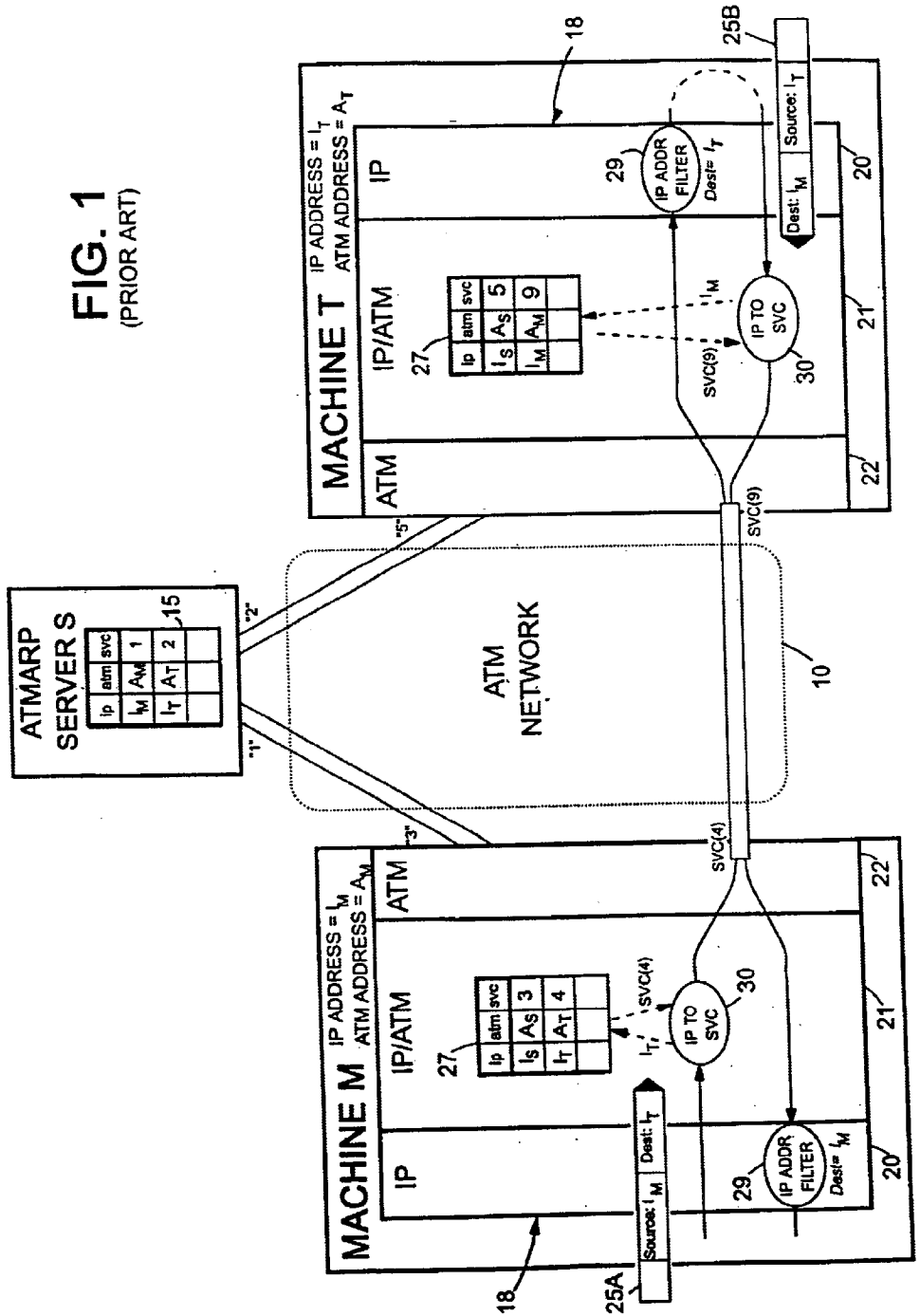
FIG. 1 is a diagram of a known system for sending IP datagrams over an ATM network between two machines M and T.
Figure 5:
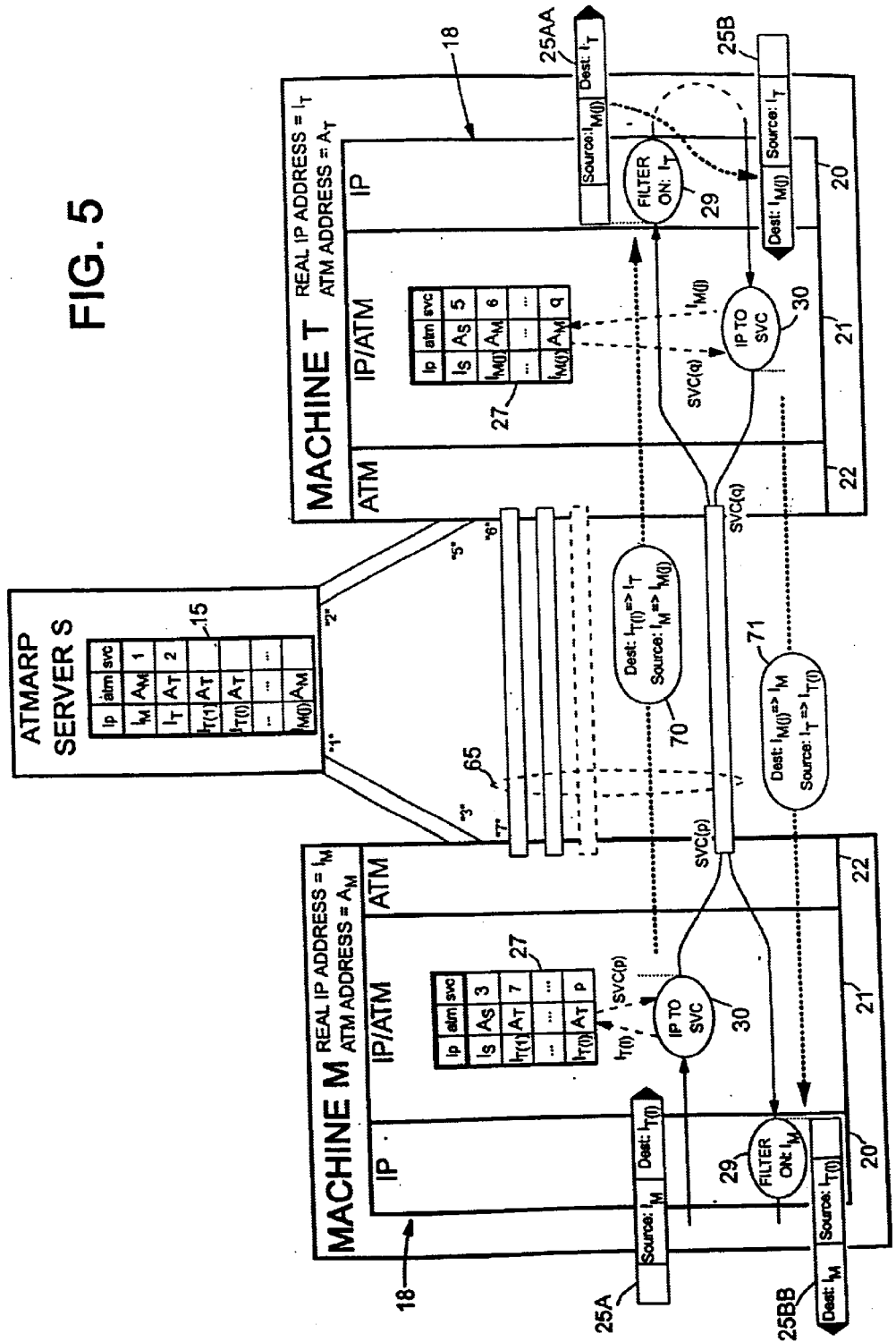
FIG. 5 is a diagram similar to FIG. 1 but showing a system embodying the invention in which multiple virtual circuits are established between machines M and T.

FIG. 5 shows a system embodying the present invention, this system being similar to that of FIG. 1 but being operative to provide a plurality of concurrent SVCs 65 between machines M and T. In the FIG. 5 system, the machines M and T and the server S are assumed to operate in the same way and have the same IP and ATM addresses as in FIG. 1; in addition, in FIG. 5 the same SVCs are established between the server S and the machines M and T as in FIG. 1. The FIG. 5 system includes, however, added functionality provided by processes 70 and 71 which in FIG. 5 are shown independent of machines M and T but in practice would be provided either distributed between machines M and T or wholly in one of these machines; in a preferred embodiment, the processes 70 and 71 are provided in machine T.

In accordance with the present invention, each machine M and T is allocated a number of virtual IP addresses different from its operative (or "real") IP address (this latter address being the one which the IP layer knows about for inclusion as the source address in outgoing datagrams and upon which filtering is carried out by task 29). Thus, machine M is allocated virtual IP addresses $I_{M(1)}, I_{M(2)}, \ldots I_{M(j)} \ldots$; similarly, machine T is allocated virtual IP addresses $I_{T(1)}, I_{T(2)}, \ldots I_{T(i)} \ldots$.

Each of these virtual IP addresses is entered into table 15 of ATMARP server S together with the ATM address of the corresponding one of the machines M,T; thus virtual IP address $I_{M(j)}$ is associated with ATM address $A_M$ and virtual IP address $I_{T(i)}$ is associated with ATM address $A_T$.

Now, if the communications interface 18 of machine M is asked to send a message to IP address $I_{T(i)}$, IP layer 20 will construct a datagram 25A having a destination address of $I_{T(i)}$ and a source address of $I_M$. The IP-to-SVC task 30 of IP/ATM layer 21 then acts in the manner already described to fetch the ATM address corresponding to $I_{T(i)}$ from server S and set up an SVC (here identified by "p") towards machine T; the cache table 27 is updated appropriately. The datagram 25A is now sent by ATM layer over SVC(p) to machine T.

If no further action is taken, the datagram 25A, after receipt at machine T, will be rejected by the filter task 29 as the destination address $I_{T(i)}$ of the datagram differs from the operative IP address $I_T$ known to task 29 of machine T. Accordingly, a process 70 is provided that recognises the destination address of datagram 25A as being a virtual IP address of machine T and substitutes the real IP address of machine T for the virtual address in the destination field of the datagram 25A. The datagram will now be allowed through by filter task 29 of machine T.

However, a further difficultly remains. If only the destination address is changed, the resultant datagram contains no indication that the datagram was not ordinarily sent with the real IP address of machine T; any reply will therefore be sent on an SVC set up to take datagrams from machine M to the real IP address of machine M. This SVC would end up taking all the reply messages for messages sent from machine M to machine T over all the SVCs set up in respect of the virtual IP addresses allocated to machine T. This is clearly undesirable. To avoid this, the source address of datagram 25A is also changed by process 70. More particularly, the source address is changed from the real IP address of machine M to one of the virtual IP addresses $I_{M(j)}$ of this machine, the virtual address chosen being dependent on the original virtual IP address forming the destination address of the datagram. As a result, all datagrams 25A having the same virtual destination address end up after operation of process 70 as datagrams 25AA with the same virtual source address, whereas datagrams 25A having different initial virtual destination addresses end up as datagrams 25AA with different source addresses. The process of changing the source address preferably involves a predetermined transformation of the virtual destination address—for example, to obtain the required virtual source address, the virtual destination address can simply be incremented by one (there would thus exist, for example, a set of even virtual IP addresses for machine M and a corresponding set of odd virtual IP addresses for machine T, each even virtual IP address of machine M being associated with the immediately adjacent, lower-valued, odd virtual IP address of machine T).

The address-changing process 70 must be carried out on datagram 25A after operation of the IP-to-SVC task 30 in machine M and prior to the filter task 29 in machine T. In addition, whilst the two address-changing operations of process 70 need not be carried out at the same time or at the same location (though it is, of course, convenient to do so), the changing of the source address must be done whilst the initial virtual destination address is still available.

The contents of datagram 25AA are passed by IP layer 20 of machine T to a high-level application which, in the present example, produces a reply that it passes to layer 20 for sending back to IP address $I_{M(j)}$, that is, to the source address contained in datagram 25AA. Layer 20 produces a datagram 25B with source address $I_T$ and destination address $I_{M(j)}$. Next, IP-to-SVC task 30 of layer 21 looks up the destination address in the cache table 27 to find out the SVC to be used for the reply. If, as will normally be the case, the same SVC is to be used for the reply as carried the original datagram 25A with destination address $I_{T(i)}$, then the SVC setup process will have been arranged to enter the address $I_{M(j)}$ in cache table 27 against that SVC (in present case, identified to machine T by "q"); a lookup on $I_{M(j)}$ will thus return "q" as the required SVC. However, if it is desired to use a different SVC for datagrams 25B passing from T to M as used for datagrams 25A passing from M to T, then the first lookup on $I_{M(j)}$ by task 30 will not identify an SVC and task 30 must then initiate set up of a new SVC.

Assuming that the same SVC is to be used for the datagrams 25B with destination address $I_{M(j)}$ as for the datagrams 25A with destination address $I_{T(i)}$, then after task 30 has identified SVC(q) as the appropriate SVC, the datagram 25B is passed to the ATM layer 22 for sending out over SVC(q). In due course, machine M receives this datagram and passes it up to IP layer 20; however, before the datagram reaches this layer, it must undergo address-change processing similar to that carried out on datagram 25A. More particularly, the virtual destination address $I_{M(j)}$ must be changed to the real IP address $I_M$ of machine M, and the real source address $I_T$ of machine T must be changed to the virtual IP address $I_{T(i)}$ of machine T associated with the virtual destination address $I_{M(j)}$. This address-change processing is carried out by process 71.

With regard to the source address change, where the corresponding change was effected for datagram 25A by incrementing by one the virtual destination address $I_{T(i)}$ of that datagram, then for datagram 25B, the source address is changed to the destination address $I_{M(j)}$ decremented by one.

In a similar manner to process 70, process 71 must be carried out on datagram 25B after operation of the IP-to-SVC task 30 in machine T and prior to the filter task 29 in machine M. In addition, whilst the two address-changing operations of process 71 need not be carried out at the same time or at the same location, the changing of the source address must be done whilst the initial virtual destination address is still available.

Following operation of process 71, datagram 25BB with source address $I_{T(i)}$ and destination address $I_M$ is allowed through by filter task 29 and the contents of the datagram are passed to the relevant high-level application.

Figure 2:
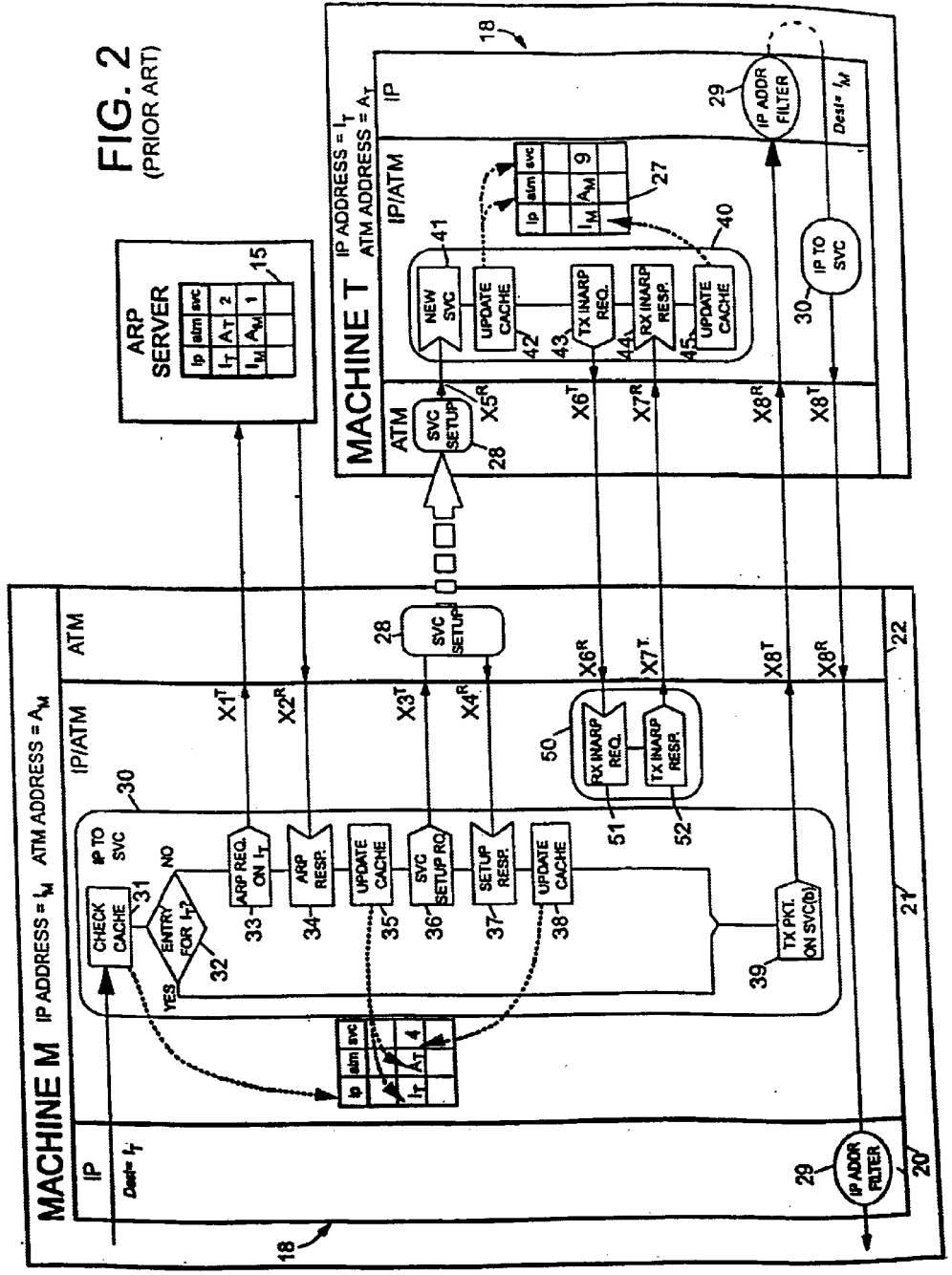
FIG. 2 is a diagram illustrating the steps carried out by the FIG. 1 system in establishing a virtual circuit between machines M and T.
Figure 3:
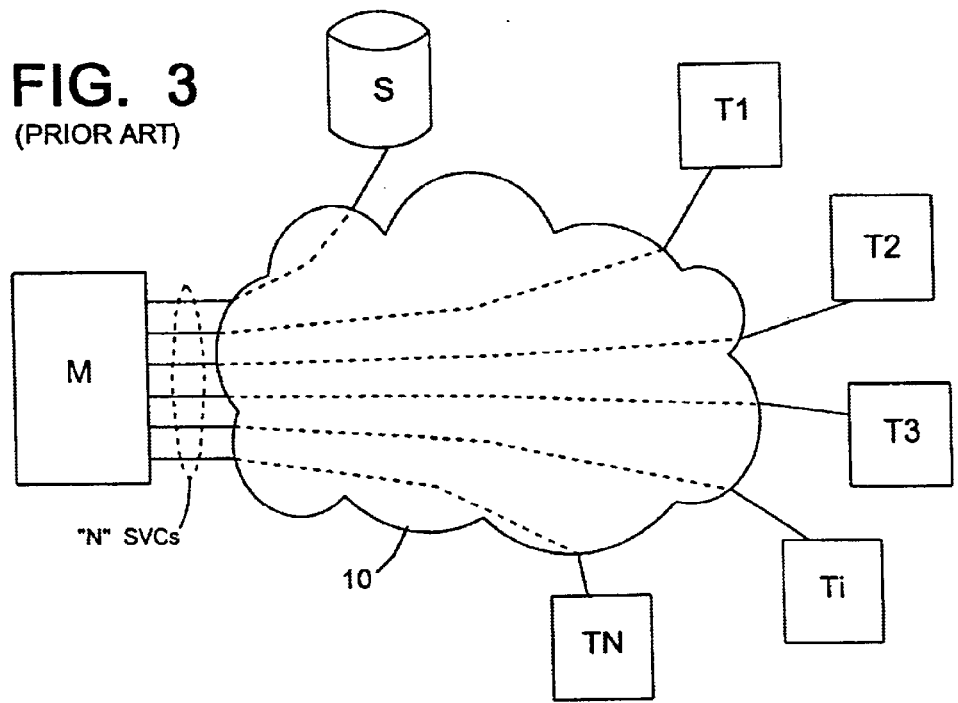
FIG. 3 is a diagram of a known test arrangement for testing the ability of a machine M to concurrently operate multiple virtual circuits.

Having described the general mechanism by which virtual IP addresses can be used for exchanging datagrams 25A and 25B across an SVC between machines M and T, the issue will now be addressed as to how the cache table 27 in machine T is updated on SVC setup to associate the new SVC (that is, SVC(q) at machine T) with the virtual IP address $I_{M(j)}$ of machine M (this is required where the same SVC is to be used for the reply datagram 25B as for the original datagram 25A). It will be appreciated that when the task 40 (see FIG. 2) is executed, the INARP request sent to machine M will only return the real IP address $I_M$ of machine M, there being no other information available to the update task 40 by which any other result could be obtained from the INARP task 50; clearly, something additonal needs to be done for update task 40 to be able to associate the virtual IP address $I_{M(j)}$ with the newly created SVC(q) in table 27. In fact, there are a number of ways in which the update task could be informed that the IP address to be associated with SVC(q) is $I_{M(j)}$. For example, the update task 40 could be arranged to send a request back over the newly-created SVC(q) asking machine M to identify the destination IP address $I_{T(i)}$ it associates with that SVC; from this information, the update task could determine the associated virtual IP address $I_{M(j)}$ of machine M (assuming there is a predetermined relation between the two as is the case in the described embodiment) and then update table 27 accordingly. An alternative approach that avoids sending a special request to machine M is to wait for machine M to supply the destination IP address $I_{T(i)}$ in the first IP datagram 25A sent over the new SVC(q), the update task then deriving the required address $I_{M(j)}$ as described above.

A variant of this latter approach is to leave the update task 40 unchanged but provide an additional process that:
(a) delays the INARP request until the destination address $I_{T(i)}$ of the first datagram from machine M to machine T can be captured;
(b) uses the captured address $I_{T(i)}$ as the source address of the INARP request that is now sent on to machine M.

Figure 6:
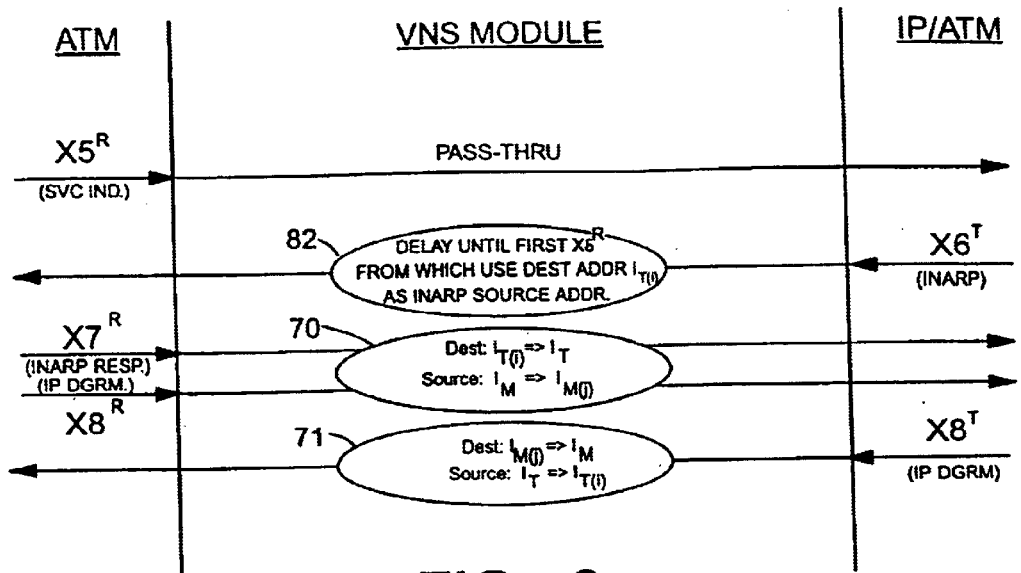
FIG. 6 is a diagram illustrating the processing effected by a module VNS disposed in machine T of the FIG. 5 system when machine M initiates the opening of a new virtual circuit between machines M and T.

The INARP response from machine M will therefore have a destination address $I_{T(i)}$ and a source address (that forms the substance of the INARP response) of $I_M$. By ensuring that this response datagram is subject to the processing effected by process 70, the source data in the INARP response will be changed to $I_{M(j)}$ by the time the response reaches the update task 40. Thus, the required updating of the table 27 of machine T can be achieved without modification to the existing tasks of machines M and T but simply by the addition of a further process for effecting steps (a) and (b) described above. This approach is the preferred one for updating table 27 and is the one used in the module described below with reference to FIGS. 6 and 7.

The above-described system involving the allocation of multiple virtual IP addresses to machines M and T and the provision of the address-changing processes 70 and 71, permits multiple SVCs to be concurrently operated between the machines M and T thereby enabling implementation of the test arrangement depicted in FIG. 4. Of course, when testing the machine M, it is desirable that no changes are made to this machine; accordingly, it is preferred for such a test arrangement to implement the address-changing processes 70 and 71 in machine T.

The implementation of the address-changing processes 70 and 71, and of the INARP request modification process, can conveniently by done by inserting a module (hereinafter called the VNS module) between the IP/ATM layer 21 and the ATM layer 22 of machine T; in fact, an instance of this module is created for each SVC, this being relatively easy to implement when using a STREAMS type I/O implementation as provided in most UNIX systems (conveniently one stream is provided for each SVC and the VNS module is pushed onto each stream when the stream is created).

The messages passing across the boundary between layers 21 and 22 have already been described above with reference to FIG. 2 and the processing effected by the VNS module on each of these messages will next be described. First, the situation of FIG. 5 will be considered where it is machine M that initiates the setting up of a new SVC to machine T. The first message received by the VNS module will be the SVC setup indication message $X5^R$ and this is passed through the VNS module without modification (see FIG. 6). Next, the INARP request $X6^T$ is received and is subject to the modification process 82 described above, namely it is delayed until the first IP datagram 25A is received and the address $I_{T(i)}$ extracted and used for the source address of the INARP request. The INARP response $X7^R$ is then received and subject to the address-changing process 70. IP datagrams $X8^R$ from machine M to machine T are also subject to the address-changing process 70. IP datagrams $X8^T$ from machine T to machine M are subject to address-changing process 71.

Figure 7:
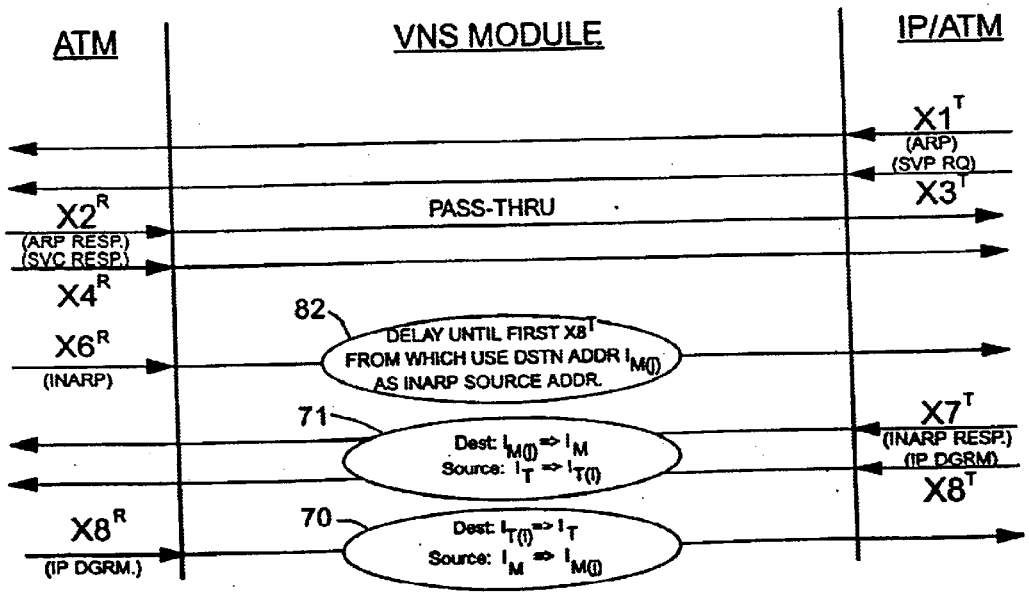
FIG. 7 is a diagram illustrating the processing effected by a module VNS disposed in machine T of the FIG. 5 system when machine T initiates the opening of a new virtual circuit between machines M and T.

FIG. 7 depicts the processing effected by the VNS module in the situation where it is the machine T rather than the machine M that initiates SVC setup. The messages passing through the VNS module in this case are those shown crossing the boundary between layers 21 and 22 in FIG. 2 for machine M. The first four messages $X1^T$, $X3^T$, $X2^R$, and $X4^R$ are passed through without modification. The INARP request received from machine M is subject to the modification process 82, being delayed until the destination address of the first IP datagram from machine T to machine M can be captured and used as the source address of the INARP request. The INARP response $X7^T$ is subjected to process 71 as are IP datagrams $X8^T$ from machine T to machine M. IP datagrams $X8^R$ from machine M to machine T are subjected to process 70.

It will be appreciated that many variants are possible to the above-described embodiment of the invention. It will also be appreciated that the invention is not limited to switched virtual circuits but can equally be applied to permanent virtual circuits. Furthermore, the setting up of multiple virtual circuits between two machines can be used not only for implementing the test arrangement described above with reference to FIG. 4 but also for other purposes.

Although the present invention has been described in the context of high-level addresses constituted by IP addresses and virtual circuits set up across an ATM network, the invention can be applied to other types high-level addresses and other types of virtual-circuit network. For example, the high-level addresses could be MAC addresses in the case of a network in the form of an emulated LAN (ELAN) over an ATM network.

What is claimed is:

1. A method for facilitating testing a network node apparatus, comprising the following steps:
   (a) establishing a plurality of switched virtual circuits between a first machine having a first high level address and a second machine having a second high level address; and,
   (b) sending a first message from the first machine to the second machine, including the following substeps:
      (b.1) constructing the first message to have a source identification equal to the first high level address and a destination identification equal to a first virtual address for the second machine,
      (b.2) sending the first message to the second machine over a first switched virtual circuit associated with the first virtual address, including the following substeps:
         (b.2.1) replacing the source identification with a first virtual address for the first machine, and
         (b.2.2) replacing the destination identification with the second high level address.

2. A method as in claim 1 additionally comprising the following step:

(c) sending a second message from the first machine to the second machine, including the following substeps:
  (c.1) constructing the second message to have a source identification equal to the first high level address and a destination identification equal to a second virtual address for the second machine,
  (c.2) sending the second message to the second machine over a second switched virtual circuit associated with the second virtual address, including the following substeps:
    (c.2.1) replacing the source identification of the second message with a second virtual address for the first machine, and
    (c.2.2) replacing the destination identification of the second message with the second high level address.

3. A method as in claim 1 where step (a) includes the following substeps:
  (a.1) assigning a plurality of virtual addresses to the first machine; and,
  (a.2) assigning a plurality of virtual addresses to the second machine.

4. A method as in claim 1, wherein step (a) includes the following substeps:
  (a.1) assigning a first plurality of virtual addresses to the first machine so that all switched virtual circuits used to send messages from the first machine to the second machine are associated with one of the virtual addresses from the first plurality of virtual addresses; and,
  (a.2) assigning a plurality of virtual addresses to the second machine so that all switched virtual circuits used to send messages from the second machine to the first machine are associated with one of the virtual addresses from the second plurality of virtual addresses.

5. A method as in claim 1 wherein step (a) includes the following substeps:
  (a.1) maintaining a first table in the first machine into which is placed an entry for each of a subset of more than one switched virtual circuits used to send messages from the first machine to the second machine, each entry including a lower level address to the first machine and one of a first plurality of virtual addresses assigned to the first machine; and,
  (a.2) maintaining a second table in the second machine into which is placed an entry for each of a subset of more than one switched virtual circuits used to send messages from the second machine to the first machine, so that each entry includes a lower level address to the second machine and one of a second plurality of virtual addresses assigned to the second machine.

6. A method as in claim 5 wherein step (a) additionally comprises the following substep:
  (a.3) maintaining a third table, with an entry for each of the first plurality of virtual addresses assigned to the second machine and an entry for each of the second plurality of virtual addresses assigned to the first machine, so that:
    each entry for each of the first plurality of virtual addresses assigned to the second machine including a lower level address to the second machine; and,
    each entry for each of the second plurality of virtual addresses assigned to the first machine including a lower level address to the first machine.

7. A method for maintaining a plurality of switched virtual circuits between a first machine having a first high level address and a second machine having a second high level address, the method comprising the following steps:
  (a) maintaining a first table in the first machine into which is placed an entry for each of a subset of more than one switched virtual circuits used to send messages from the first machine to the second machine, each entry including a lower level address to the second machine and one of a first plurality of virtual addresses assigned to the second machine; and,
  (b) maintaining a second table in the second machine into which is placed an entry for each of a subset of more than one switched virtual circuits used to send messages from the second machine to the first machine, so that each entry includes a lower level address to the first machine and one of a second plurality of virtual addresses assigned to the first machine.

8. A method as in claim 7 additionally comprising the following step:
  (c) maintaining a third table, with an entry for each of the first plurality of virtual addresses assigned to the second machine and an entry for each of the second plurality of virtual addresses assigned to the first machine, so that:
    each entry for each of the first plurality of virtual addresses assigned to the second machine including a lower level address to the second machine; and,
    each entry for each of the second plurality of virtual addresses assigned to the first machine including a lower level address to the first machine.

* * * * *